(12) United States Patent
Abe

(10) Patent No.: US 10,853,652 B2
(45) Date of Patent: Dec. 1, 2020

(54) MEASUREMENT DATA COLLECTION DEVICE AND PROGRAM

(71) Applicant: Mitutoyo Corporation, Kanagawa (JP)

(72) Inventor: Shinsaku Abe, Hokkaido (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 16/591,733

(22) Filed: Oct. 3, 2019

(65) Prior Publication Data

US 2020/0134317 A1 Apr. 30, 2020

(30) Foreign Application Priority Data

Oct. 29, 2018 (JP) .................................. 2018-203128

(51) Int. Cl.
| | |
|---|---|
| *G06K 9/00* | (2006.01) |
| *G06T 19/00* | (2011.01) |
| *G06T 7/70* | (2017.01) |
| *G06K 9/32* | (2006.01) |
| *H04N 5/232* | (2006.01) |
| *G06F 3/00* | (2006.01) |

(52) U.S. Cl.
CPC ....... *G06K 9/00671* (2013.01); *G06K 9/3216* (2013.01); *G06T 7/70* (2017.01); *G06T 19/006* (2013.01); *G06F 3/00* (2013.01); *G06K 9/00771* (2013.01); *G06K 2009/3225* (2013.01); *G06T 2207/10028* (2013.01); *H04N 5/23203* (2013.01); *H04N 5/23222* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 9,798,143 B2 * | 10/2017 | Fujimaki | G02B 27/017 |
| 2017/0214907 A1 * | 7/2017 | Lapstun | H04N 13/344 |
| 2018/0096531 A1 * | 4/2018 | Greenhalgh | H04L 63/0861 |
| 2018/0217379 A1 * | 8/2018 | Nishizawa | G02B 27/0172 |

FOREIGN PATENT DOCUMENTS

JP 2016-186439 10/2016

\* cited by examiner

*Primary Examiner* — YuJang Tswei

(74) *Attorney, Agent, or Firm* — Rankin, Hill & Clark LLP

(57) ABSTRACT

A measurement data collection device includes a head-mounted display unit and a control unit to control the head-mounted display unit, and the measurement data collection device collects a measurement value measured by a measurement tool handled by the user. The head-mounted display unit includes a frame wearable on the head of the user, a display screen of transmissive type to display a three-dimensional image by superimposing the three-dimensional image on a real space, and a camera supported by the frame. Additionally, the control unit includes, a support information generation unit to generate a guide frame as support information, the guide frame being displayed in a reading position, a display control unit to control the support information generated by the support information generation unit, and a measurement value reading unit to read a measurement value by analyzing an image of the measurement tool captured by the camera.

9 Claims, 11 Drawing Sheets

| TOOL TYPE | MODEL NUMBER | THREE-DIMENSIONAL SHAPE MODEL | SHAPE OF MEASUREMENT VALUE DISPLAY | SHAPE OF GUIDE FRAME | SIZE OF GUIDE FRAME | ... |
|---|---|---|---|---|---|---|
| CALIPER | ABC1234 |  |  |  | 1.5 cm × 3.0 cm | ... |
| DIAL GAUGE | DEF5678 |  |  |  | 3.0 cm × 5.0 cm | ... |
| ... | ... | ... | ... | ... | ... | ... |

| MEASUREMENT VALUE | MEASUREMENT DATE AND TIME | TYPE OF MEASUREMENT TOOL | MODEL NUMBER OF MEASUREMENT TOOL |
|---|---|---|---|
| 22.456 mm | 2018/10/05 10:45:23 | CALIPER | ABC1234 |
| 22.587 mm | 2018/10/05 10:46:34 | CALIPER | ABC1234 |
| 22.393 mm | 2018/10/05 10:47:13 | CALIPER | ABC1234 |
| 22.503 mm | 2018/10/05 10:47:59 | CALIPER | ABC1234 |
| 22.443 mm | 2018/10/05 11:07:05 | CALIPER | ABC1234 |
| ... | ... | ... | ... |
| 22.631 mm | 2018/10/05 13:04:36 | CALIPER | ABC1234 |
| 22.481 mm | 2018/10/05 13:06:28 | CALIPER | ABC1234 |
| 22.528 mm | 2018/10/05 13:08:48 | CALIPER | ABC1234 |

FIG. 5

MEASUREMENT DATA COLLECTION DEVICE AND PROGRAM

TECHNICAL FIELD

The present invention relates to a measurement data collection device configured to collect measurement values measured by a measurement tool.

BACKGROUND ART

Measurement tools such as a caliper, a micrometer, a dial gauge, or the like can be classified into an analog type measurement tool and a digital type measurement tool, both of which differ in the display format of measurement values. A user measures a target object by using a measurement tool, reads measurement values of the target object, and utilizes the measurement data.

In the case of an analog type measurement tool, measurement values to be indicated on a scale are collected by a user in such a way that the measurement values are manually recorded on paper or a computer. In the case of a digital type measurement tool, measurement values to be indicated in numbers on a display such as a liquid crystal display are collected manually in the same way as in the analog measurement tool, by a method of transferring to a computer via wired communication or wireless communication, or by other methods.

Regardless of whether the display format of the measurement values being an analog type or a digital type, in a case where measurement values measured by a measurement tool that does not have a communication function are collected a user needs to manually enter the measurement values every time measuring one target object. In the case of measuring multiple measurement target objects, a user needs to repeat such a manual entry work over and over; therefore, the measurement by a measurement tool that does not have a communication function has been inefficient.

In addition, in the case of collecting measurement values measured by a measurement tool having a communication function, while the burden of collecting the measurement values is reduced and work efficiency is improved, since a measurement tool having a communication function is expensive or requires a replacement for an existing measurement tool, a user who has used a measurement tool that does not have a communication function has a problem of adopting a new measurement tool having a communication function.

Accordingly, a device configured to easily collect measurement values with a measurement tool that does not have a communication function has been desired, and a measurement data collection device described in Patent Document 1 is proposed. The measurement data collection device includes an imaging module configured to capture an appearance image of the measurement tool on which a measurement value is displayed and a measurement value reading module configured to read a measurement value from the appearance image of the measurement tool captured by the imaging module. Although the measurement tool itself does not have a communication function, the measurement value can be easily measured.

CITATION LIST

Patent Literature

Patent Document 1: JP 2016-186439 A

SUMMARY OF INVENTION

Technical Problem

However, the measurement data collection device described in Patent Document 1, a user may have difficulty grasping a position (hereinafter, referred to as "reading position") to be aligned with a measurement value display of the measurement tool in order to capture an image that allows a measurement value of the measurement tool to be easily read. Thus, although the user desires to collect measurement values, the measurement values may not be collected because of the tool disposed in an inappropriate position. In addition, although the user does not desire to collect measurement values, the measurement values may be collected at an unnecessary timing to the user because of the measurement tool unintentionally disposed at the reading position.

The invention is thus made in view of the foregoing problem, and an object of the invention is to provide a measurement data collection device that can easily collect measurement data by displaying support information adapted to support an operation by a user.

Solution to Problem

In order to solve the above problems, a measurement data collection device according to the invention includes a head-mounted display unit wearable on the head of a user; and a control unit configured to control the head-mounted display unit. The measurement data collection device is configured to collect a measurement value measured by a measurement tool handled by the user. The head-mounted display unit includes, a frame wearable on the head of the user, a display screen of transmissive type supported by the frame at a position to cover a field of view of the user in a state where the head-mounted display unit is worn by the user and configured to display a three-dimensional image by superimposing the three-dimensional image on a real space, and a camera supported by the frame at a position to image the front of the user in a state where the head-mounted display unit is worn by the user. In addition, the control unit includes a support information generation unit configured to generate a guide frame as support information, the guide frame being displayed in a reading position which is a suitable position of the measurement tool to be imaged by the camera, a display control unit configured to control the support information generated by the support information generation unit to be displayed on the display screen, and a measurement value reading unit configured to read a measurement value by analyzing an image of the measurement tool captured by the camera.

In the invention, the support information generation unit may generate the guide frame in fixed coordinates on a relative coordinate system based on a point of the head-mounted display unit.

In the invention, the head-mounted display unit may further include a 3D sensor supported by the frame to face toward the front of the user in a state where the head-mounted display unit is worn by the user and configured to acquire point cloud data indicating a position of an object body in front of the user. In addition, the control unit may further include a three-dimensional information analysis unit configured to identify, based on the point cloud data acquired by the 3D sensor, a position of the measurement tool handled by the user. The support information generation unit may generate, based on the position of the measurement tool identified by the three-dimensional information analysis unit, navigation information as the support information, the navigation information guiding the user to move the measurement tool close to the reading position.

In the invention, when the position of the identified measurement tool coincides with the reading position, the three-dimensional information analysis unit may output a trigger signal for prompting the camera to capture the image of the measurement tool.

In the invention, the three-dimensional information analysis unit may identify, based on the point cloud data acquired by the 3D sensor, the type of the measurement tool handled by the user, and identify, in accordance with the type of the measurement tool, the size, position, and/or shape of the guide frame generated by the support information generation unit.

In the invention, the measurement data collection device may further include a measurement data storage unit configured to store measurement data obtained by associating the measurement value read by the measurement value reading unit with information of the measurement tool used in the measurement.

To solve the above problem, a program according to the invention allows a computer to function as the control unit of any of the measurement data collection devices described above.

BRIEF DESCRIPTION OF DRAWINGS

FIG. 5 illustrates an example of data stored in a measurement data storage unit.

DESCRIPTION OF EMBODIMENTS

An embodiment of the invention will be described hereinafter on the basis of the drawings. In the present specification and the drawings, elements similar to those described above with respect to the drawings that have been previously present are assigned with the same reference signs or numbers, and detailed descriptions of the elements will be omitted as appropriate.

Descriptions of Device and Components

Figure 1:
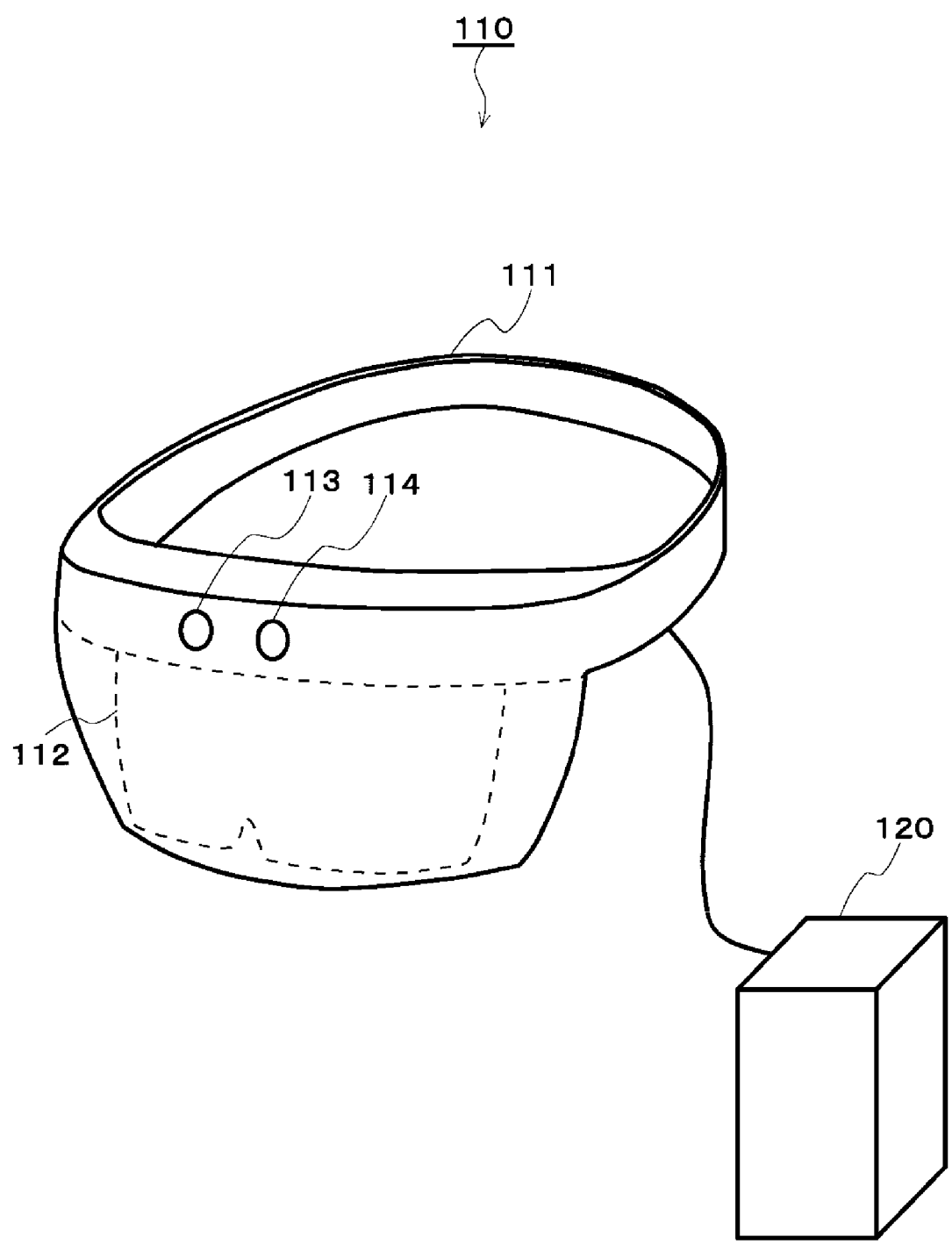
FIG. 1 is a configuration drawing of a measurement data collection device.
Figure 2:
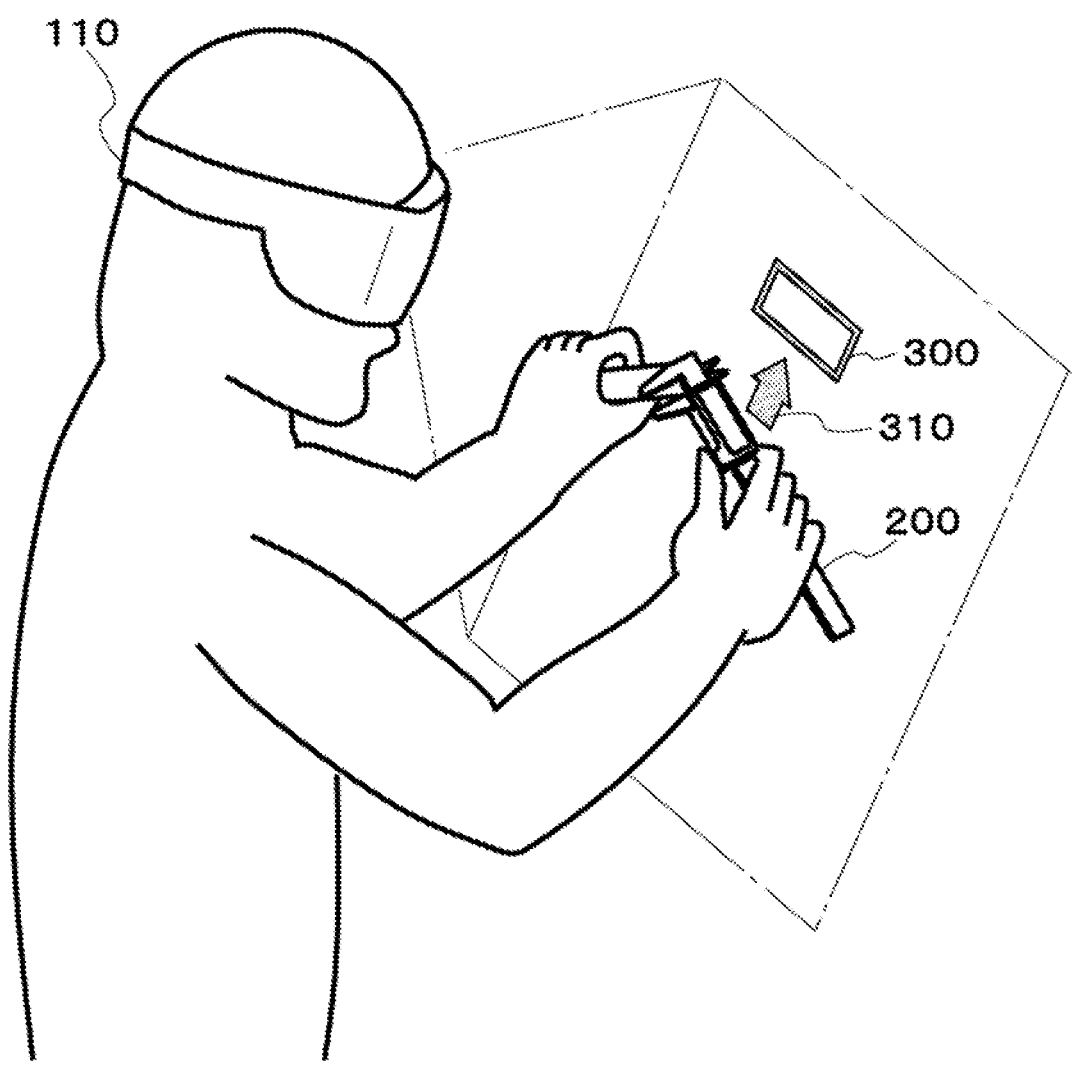
FIG. 2 is a drawing schematically illustrating a situation where a user wearing the measurement data collection device is using a measurement tool.

FIG. 1 illustrates the configuration of a measurement data collection device 100 according to an embodiment of the invention. FIG. 2 illustrates a situation where a user wearing a head-mounted display (HMD) unit 110 is conducting measurement by using a measurement tool 200. As illustrated in FIG. 1, the measurement data collection device 100 includes the head-mounted display unit 110 (hereinafter, referred to as the HMD unit 110) and a control unit 120. The HMD unit 110 and the control unit 120 are wired or wirelessly connected to communicate with each other.

The HMD unit 110 includes a frame 111, a display screen 112, a camera 113, and a 3D sensor 114. The frame 111 is to be worn on the head of the user using the measurement data collection device 100 and is designed to support the display screen 112, the camera 113, and the 3D sensor 114. The frame 111 is an eyeglasses type frame to be supported by right and left ears and a nose, a goggles type frame to be supported in a state an elastic belt is bound around a head, a helmet type frame wearable on a head while covering the head, or the like. Alternatively, any type of the frames may be used as the frame 111 as long as the frame can stably support the display screen 112, the camera 113, and the 3D sensor 114.

The display screen 112 is a display device of transmissive type configured to display a three-dimensional image and is provided in a position covering a field of view of a user wearing the HMD unit 110. The user wearing the HMD unit 110 can visually recognize objects present in a real space through the display screen 112. In addition, the user can visually recognize objects that are three-dimensionally displayed on the display screen 112 as being present in a virtual space. Therefore, the HMD unit 110 may provide the user with a mixed reality (Mixed Reality: MR) space in which objects present in a real space and objects present in a virtual space are superimposed.

Such an HMD unit 110 is utilized and thus the measurement data collection device 100 displays support information as an object in a virtual space on the display screen 112 for facilitating reading by the measurement data collection device 100 in a measurement operation by use of a measurement tool present in a real space; therefore, an operation by the user is supported.

The camera 113 is configured to capture an appearance image of the measurement tool 200 on which a measurement value is displayed. The camera 113 may be a camera configured to capture a still image. Alternatively, a video camera or the like configured to extract a still image from a moving image and output the still image may be used as the camera 113. The camera 113 may be provided, for example, near the center of the frame 111 to be oriented in a direction in which an image of the front of the user wearing the HMD unit 110 is captured. As described below, the camera 113 performs image capturing at a timing when a trigger signal from a three-dimensional information analysis unit 123 is provided and obtains an appearance image in which a measurement value display 210 of the measurement tool 200 is imaged.

The 3D sensor 114 is a sensor configured to acquire point cloud data indicating a distance (depth) to an object body in a predetermined detection range. Any of various types of sensors such as a Time of flight (TOF) sensor, a triangulation sensor may be used as the 3D sensor 114. The 3D sensor 114 is provided, for example, near the center of the frame 111 such that the center of the detection range faces toward the front of the user wearing the HMD unit 110 and acquires point cloud data indicating the position of an object body in front of the user.

The control unit 120 is a controller configured to control the HMD unit 110. In the present embodiment, the control unit 120 is wired or wirelessly connected to the HMD unit 110 but may be configured integrally with the HMD unit 110. The control unit 120 performs processing of reading measurement values from an appearance image of the measurement tool 200, which is captured by the camera 113, and collecting the measurement values while displaying the support information on the display screen 112. The control unit 120 is, for example, realized by a computer including a CPU, a storage medium, an input/output module, and the like. In other words, the function of each of blocks configuring the control unit 120 may be realized by executing a program stored in the storage medium by the CPU.

Figure 3:
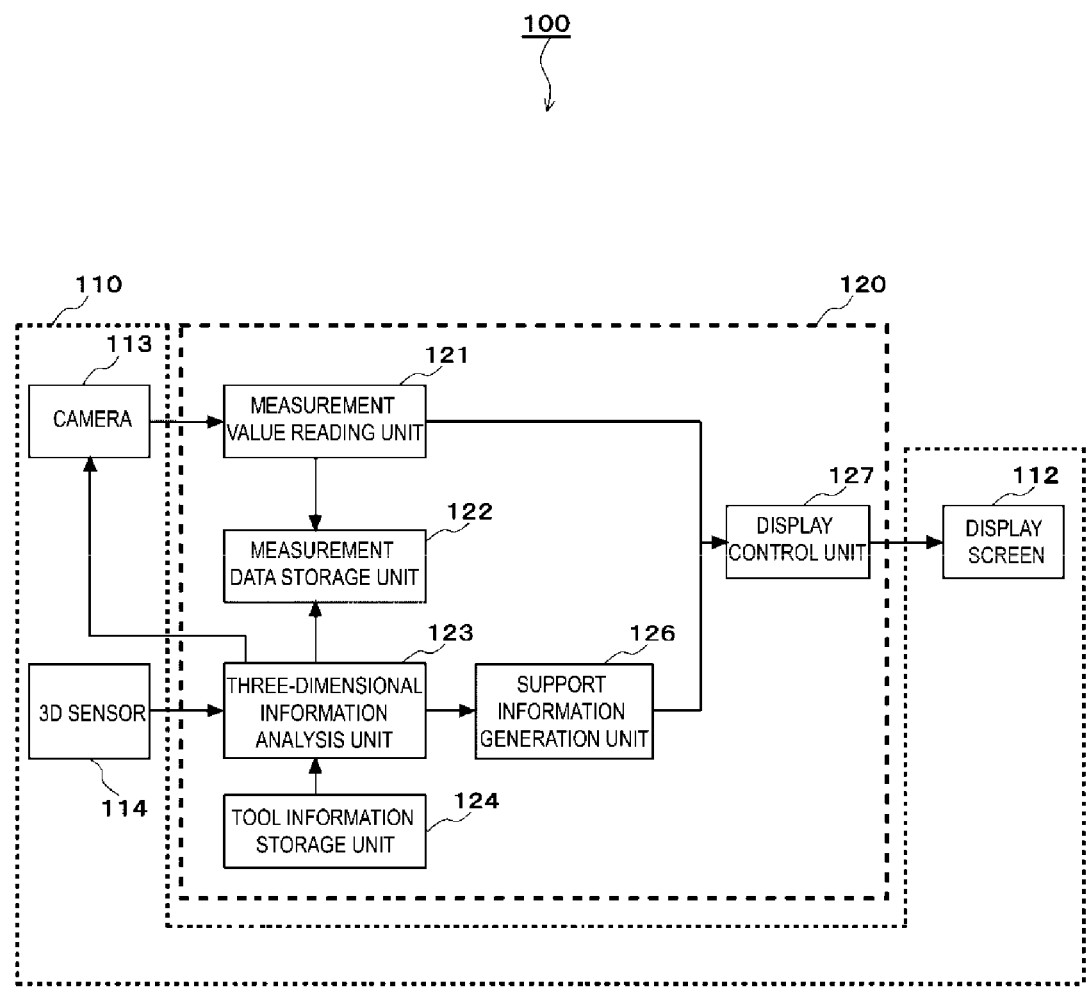
FIG. 3 is a functional block diagram of the measurement data collection device.

FIG. 3 is a functional block diagram of the measurement data collection device 100 according to the present embodiment and illustrates the configuration of the control unit 120 in detail. As illustrated in FIG. 3, the control unit 120 includes the three-dimensional information analysis unit 123, a tool information storage unit 124, a support information generation unit 126, a measurement value reading unit 121, a measurement data storage unit 122, and a display control unit 127.

Figure 4:
FIG. 4 illustrates an example of data stored in a tool information storage unit.
Figure 4:
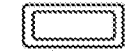
Figure 4:
Figure 4:
Figure 4:
Figure 4:

The tool information storage unit 124 is realized by a storage medium such as a random-access memory (RAM), a hard disk drive (HDD), a solid-state drive (SSD), or the like. As illustrated in FIG. 4, the tool information storage unit 124 stores information (for example, a model number) identifying the measurement tool 200, the three-dimensional shape model of the measurement tool 200, the position and shape of the measurement value display 210 of the measurement tool 200, the shape, size, display position, and the like of a guide frame 300, which is displayed to indicate a reading position, by associating such pieces of information with one another.

The three-dimensional information analysis unit 123 analyzes the point cloud data acquired by the 3D sensor 114 and identifies the profile and position of the measurement tool 200 used by the user. Then, the three-dimensional information analysis unit 123 refers to the tool information storage unit 124 for the profile of the identified measurement tool 200 and identifies the measurement tool 200. Note that "identifying the measurement tool" may mean identifying the type and model number of the measurement tool or identifying a certain measurement tool.

The three-dimensional information analysis unit 123 outputs a trigger signal that prompts the camera 113 to capture an appearance image of the measurement tool 200 when the current position of the identified measurement tool 200 coincides with a reading position of the identified measurement tool. Thus, the camera 113 does not need to consistently capture images. Further, the three-dimensional information analysis unit 123 refers to the tool information storage unit 124 for identifying and providing the position of the identified measurement tool 200; and the shape, size, display position, and the like of the guide frame 300 corresponding to the identified measurement tool to the support information generation unit 126. In addition, only a portion of the shape, size, and display position of the guide frame 300 may be provided to the support information generation unit 126.

The support information generation unit 126 is configured to generate information for facilitating the measurement tool 200 to be aligned with a proper reading position by the user. The support information includes, for example, the guide frame 300 indicating a reading position, navigation information 310 for guiding the user to move the measurement tool 200 closer to the reading position, and the like.

Since the reading position is a suitable position of a subject to be imaged by the camera 113 fixed to the frame 111, the guide frame 300 is arranged in fixed coordinates on a relative coordinate system based on one point of the HMD unit 110 itself in a virtual space. In other words, even when the user wearing the HMD unit 110 on the head moves the head, the guide frame 300 is always displayed in the same position within a field of view of the user, which is visible via the display screen 112.

In addition, the guide frame 300 may have a shape matching the outline of the measurement value display 210 of the measurement tool 200. For example, in a measurement tool provided with the measurement value display 210 formed in a square as in a digital type caliper or digital type dial gauge, the guide frame 300 may be formed in a square sized in conformity to the size of the measurement value display 210. In addition, in a measurement tool provided with the measurement value display 210 formed in a circle as in a dial gauge having an analog display, the guide frame 300 may be formed in a circle sized in conformity to the size of the measurement value display 210.

The measurement value reading unit 121 is configured to read a measurement value by analyzing an appearance image of the measurement tool 200 captured by the camera 113. For example, in the case of a digital type measurement tool, each digit of numbers displayed on the measurement value display 210 is each identified from the appearance image of the measurement tool, and thereby a measurement value is read. In the case of an analog type measurement tool, the scale is analyzed from an appearance image of the measurement tool in accordance with scale reading specific to each measurement tool such as a caliper, a micrometer, a dial gauge, or the like, and thereby a measurement value is read. Then, the measurement value reading unit 121 stores the read measurement value in the measurement data storage unit 122 by associating the measurement value with information such as the measurement date and time, the model number of the measurement tool 200 identified by the three-dimensional information analysis unit 123, and the like. As illustrated in FIG. 5, the measurement data storage unit 122 associates the above-described information and stores as measurement data. In addition, the measurement data storage unit 122 is realized by a storage medium such as a random-access memory (RAM), a hard disk drive (HDD), a solid-state Drive (SSD), or the like. The measurement data storage unit 122 and the tool information storage unit 124 may share one storage medium.

Figure 6:
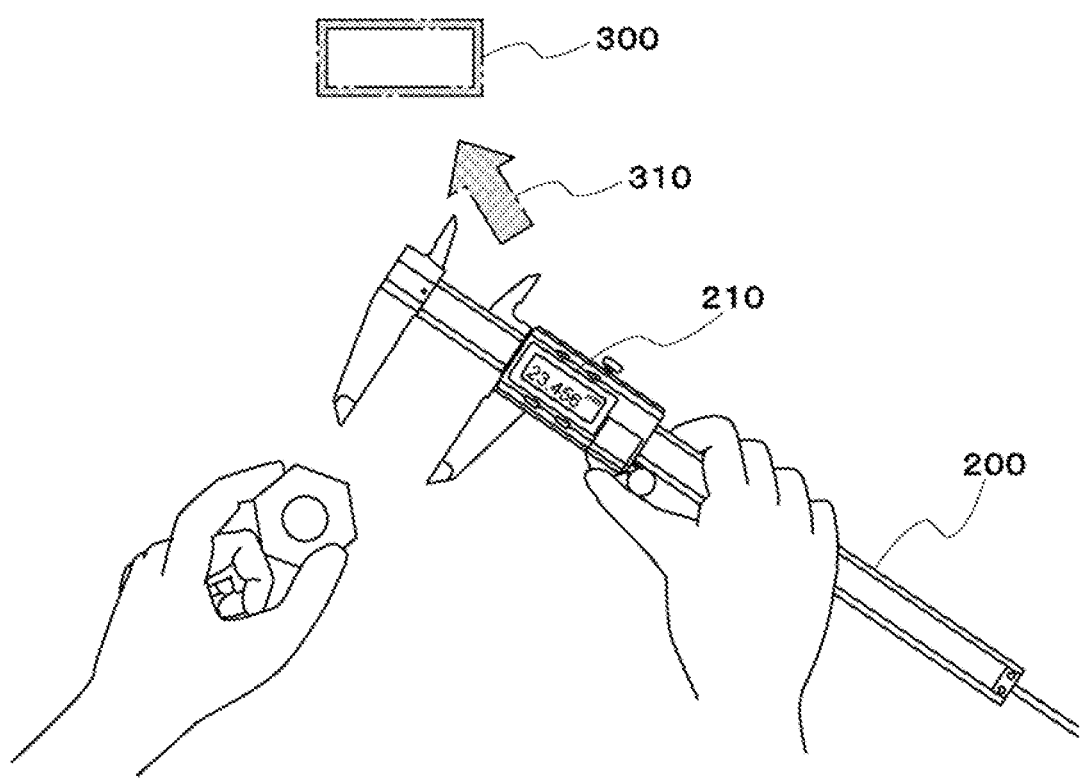
FIG. 6 illustrates an example of a field of view of a mixed reality in which a display of a virtual space is superimposed on the measurement tool that can be seen transmissively through a display screen.

The display control unit 127 is configured to control display on the display screen 112. Specifically, the display control unit 127 allows the display screen 112 to display support information generated by the support information generation unit 126 and a measurement value obtained from the measurement value reading unit 121. FIG. 6 illustrates an example of a field of view of a mixed reality in which a display of a virtual space on the display screen 112 is superimposed on the measurement tool 200 that can be seen transmissively through the display screen 112. The guide frame 300 is displayed on the display screen 112 in coordinates in the virtual space corresponding to the reading position. In addition, in accordance with the current position and the reading position of the measurement tool 200, a graphic or the like indicating the navigation information 310 is displayed in the virtual space. Moreover, the measurement value read by the measurement value reading unit 121 is displayed in a measurement value display area 320 located near the guide frame 300.

Measurement Data Collection Processing

Figure 7:
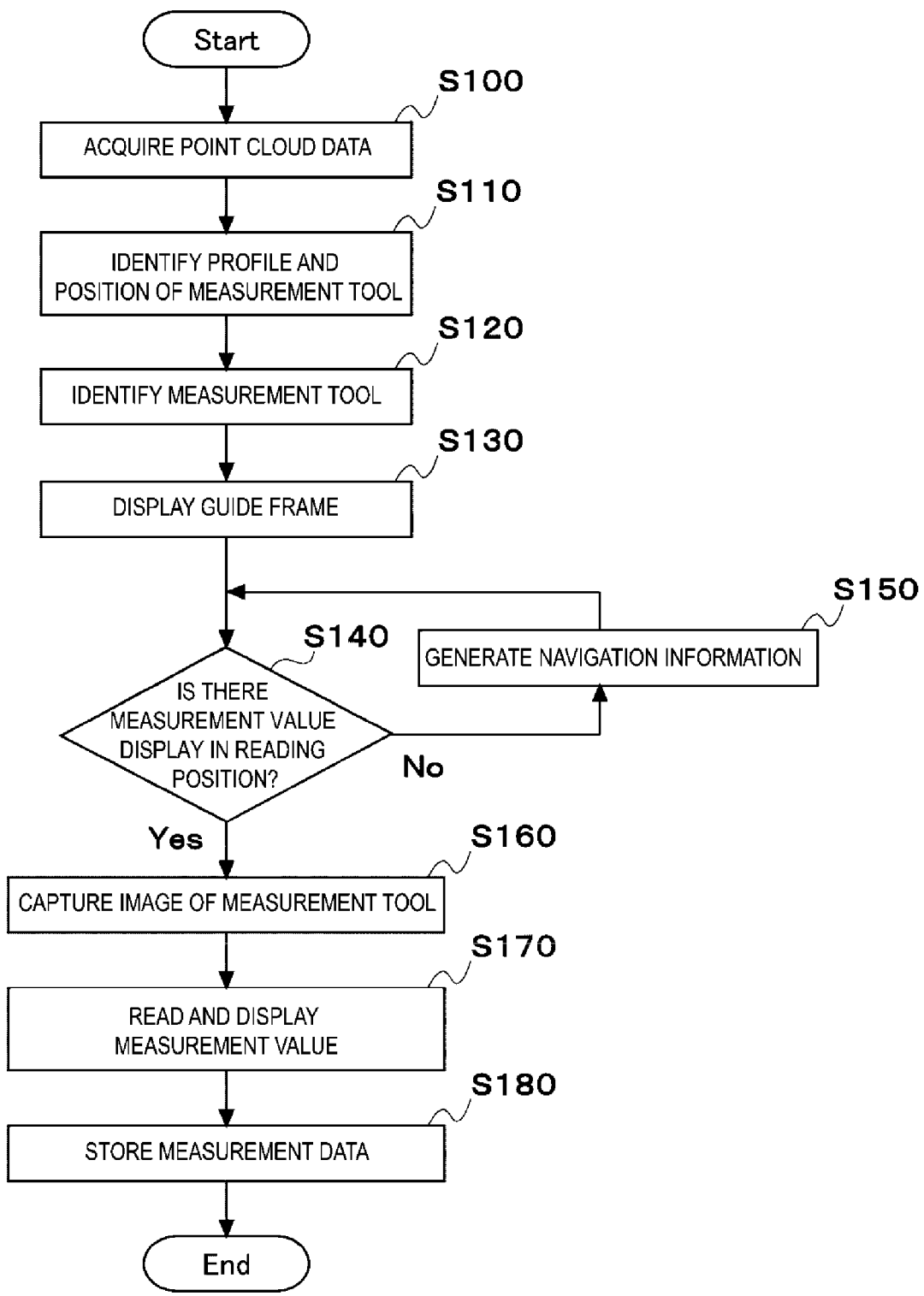
FIG. 7 is a flow chart of measurement data collection processing.

Next, the procedure of measurement data collection processing implemented by the measurement data collection device 100 configured as described above will be described. FIG. 7 is a flow chart of the measurement data collection processing. Prior to starting the measurement data collection processing, the user wears the HMD unit 110 and activates the measurement data collection device 100. The measurement data collection processing is initiated at any time that is appropriate for the user. For example, an object body is detected by the 3D sensor 114 in an area where the measurement tool 200 is assumed to be located when being handled manually by the user, and such a detection may initiate the measurement data collection processing.

First, the 3D sensor 114 searches a predetermined detection range in front of the user to obtain point cloud data that indicates a distance (depth) to the object body in front of the user (step S100).

Next, the three-dimensional information analysis unit 123 analyzes the point cloud data acquired by the 3D sensor 114, identifies the profile and position of the measurement tool 200 (step S110), and refers to the tool information storage unit 124 for the profile of the analyzed measurement tool 200, therefore identifying the measurement tool 200 (step S120). In addition, although not specified in the flowchart, subsequently, the three-dimensional information analysis unit 123 periodically analyzes the point cloud data acquired by the 3D sensor 114 and thereby updates the position of the measurement tool 200 as necessary. Moreover, in a case where the profile of the measurement tool 200 is not included in the point cloud data, the point cloud data is periodically acquired to analyze whether the profile of the measurement tool 200 is included in the point cloud data.

Figure 8:
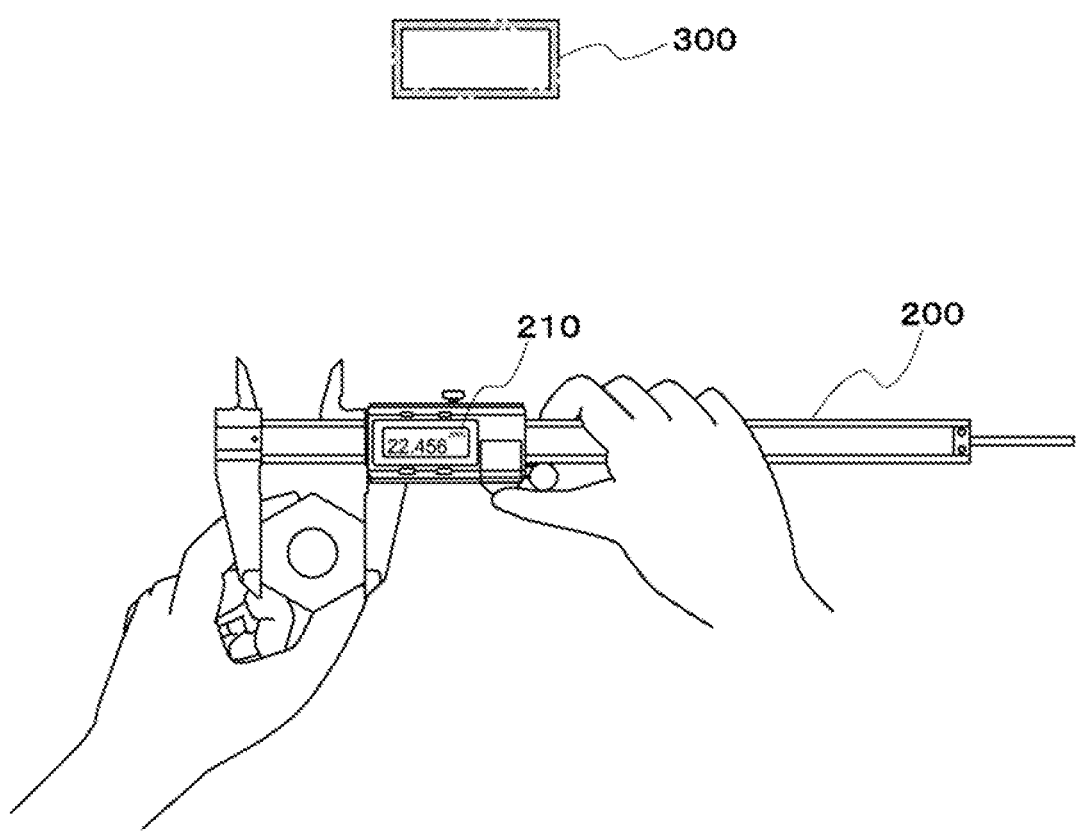
FIG. 8 illustrates an example of a field of view of a mixed reality in which a guide frame is displayed as support information.

Next, as illustrated in FIG. 8, the support information generation unit 126 allows the guide frame 300 corresponding to the measurement tool 200 identified by the three-dimensional information analysis unit 123 to be displayed on the display screen 112 via the display control unit 127 (step S130).

The three-dimensional information analysis unit 123 determines whether the measurement value display 210 of the measurement tool is located in the reading position (i.e., within the guide frame 300) (step S140). In a case where the measurement value display 210 is not located in the reading position (step S140; No), the support information generation unit 126 generates the navigation information 310 that guides the user to move the measurement value display 210 to the reading position and allows the display screen 112 to display the navigation information 310 via the display control unit 127 on the display screen 112 (step S150).

Figure 9:
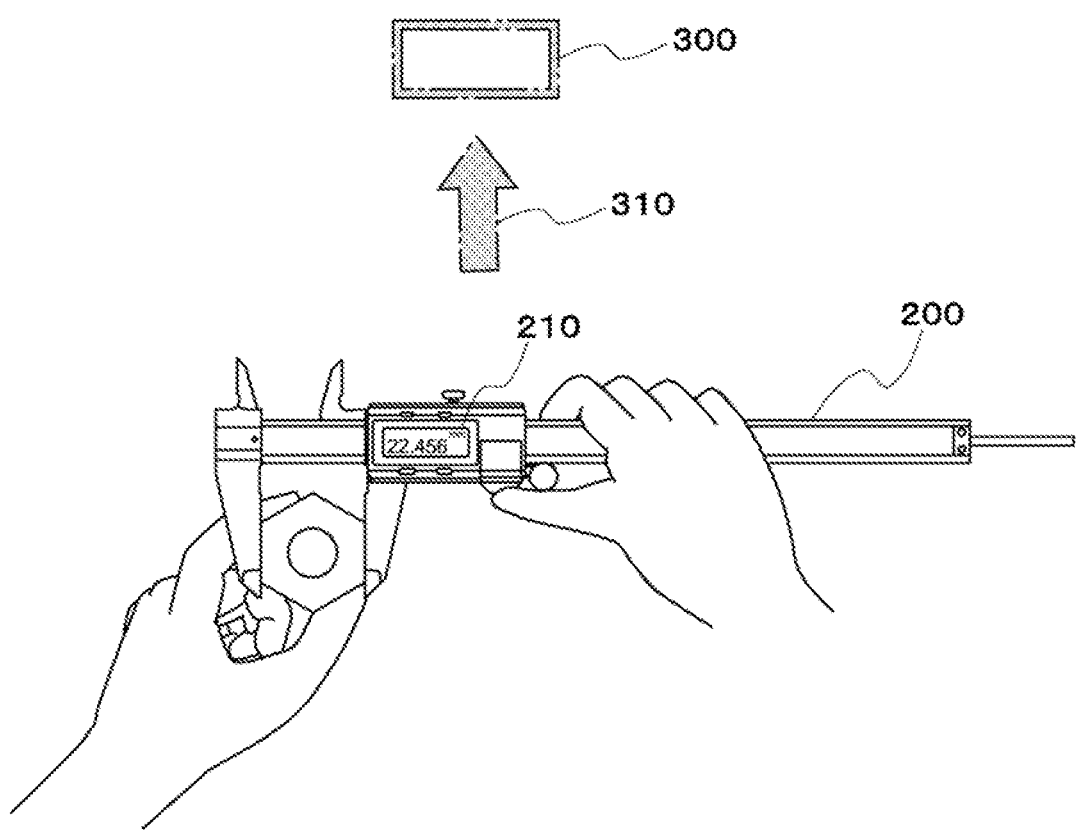
FIG. 9 illustrates an example of a field of view of a mixed reality in which, in addition to the guide frame, navigation information is displayed as support information.

In an example illustrated in FIG. 9, the guide frame 300 indicating the reading position is displayed, and an arrow directed to the guide frame 300 is displayed in 3D as the navigation information between the current position of the measurement tool and the guide frame 300. The user may move the measurement tool 200 in the direction indicated by the arrow to align the measurement value display 210 to the reading position.

The three-dimensional information analysis unit 123 repeatedly executes steps S140 and S150 until the measurement value display 210 is moved to the reading position.

At the timing when a measurement target object is appropriately measured with the measurement tool, the user moves the measurement tool 200 with reference to the guide frame 300 and the navigation information 310; therefore, the measurement value display 210 is brought to the reading position.

Figure 10:
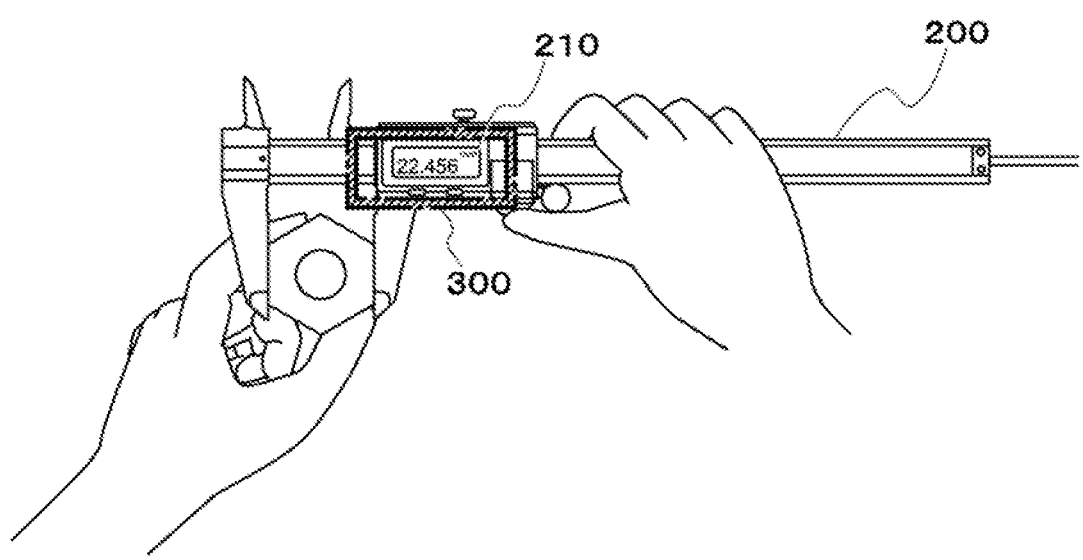
FIG. 10 illustrated an example of a field of view of a mixed reality in a state where the measurement tool is located at a reading position.
Figure 11:
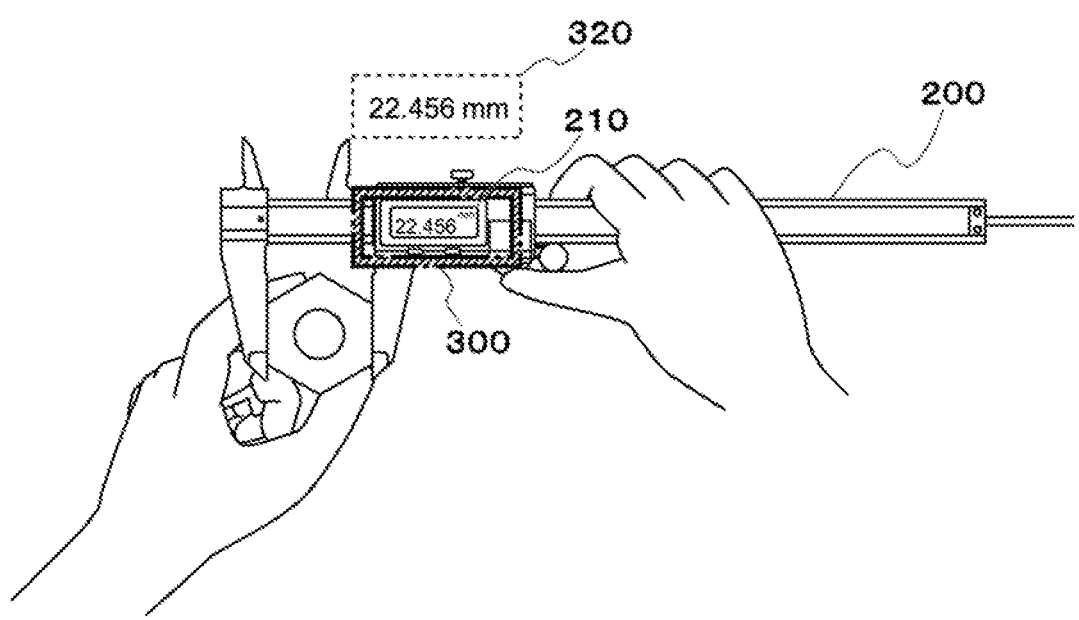
FIG. 11 illustrates an example of a field of view of a mixed reality after a measurement value of the measurement tool is read.

FIG. 10 illustrates an example of display of the support information in a state where the measurement value display 210 is positioned in the reading position, together with the measurement tool 200 that can be seen transmissively through the display screen 112. As illustrated in FIG. 10, presentation, for example, by changing a mode of displaying the guide frame 300 may be made and thereby the user easily recognizes that the measurement value display 210 is brought to the reading position.

When the measurement value display 210 is located in the reading position (step S140; Yes), the three-dimensional information analysis unit 123 outputs to the camera 113, a trigger signal for indicating the timing that the appearance image of the measurement tool 200 needs to be captured. The camera 113 receives the trigger signal and thereafter captures the appearance image of the measurement tool 200 (step S160).

Next, the measurement value reading unit 121 analyzes the appearance image of the measurement tool 200 captured by the camera 113, reads a measurement value, and allows the value to be displayed in the measurement value display area 320 via the display control unit 127 (step S170). Since the measurement value display area 320 is located near the guide frame 300, the user can verify the value read by the measurement value reading unit 121 with the measurement value indicated on the measurement value display 210 of the measurement tool 200 by comparing each value side by side. At the time of completion of reading the measurement value, the user may be notified of the completion of reading. Next, information such as the measurement value read by the measurement value reading unit 121, the measurement date and time, and the model number of the measurement tool 200 identified by the three-dimensional information analysis unit 123 is stored in association with one another in the measurement data storage unit 122 (step S180), and a series of steps of the measurement data collection processing is finished.

According to the procedure described above, the support information such as the guide frame 300, the navigation information 310, or the like is provided to the user by use of augmented reality, and thus the user can easily collect the measurement data with the measurement data collection device 100 at a desired timing.

Variations on Embodiments

The invention is not limited to the aforementioned example of the embodiment, and variations, improvements, or the like made within a scope where the object of the invention can be achieved are included in the invention. For example, in the aforementioned embodiment, a case where the arrow directed to the guide frame 300 is displayed as the navigation information between the current position of the measurement tool and the guide frame 300 is described as an example; however, a mode of displaying the navigation information is not limited thereto. The navigation information may be displayed in any manner as long as information for moving the measurement tool 200 to the reading position can be provided to a user. Further, in the configuration of the measurement data collection device 100 including an appropriate output module such as a speaker, a vibrator, or the like, the navigation information, the information that the measurement tool is moved to the reading position, or other information may be presented to a user not only via display on the display screen 112 but also via auditory information such as sound, tactile information such as vibration, or via other information.

Furthermore, in the aforementioned embodiment, for each measurement tool, the shape, size, display position, and the like of the guide frame 300 are stored in the tool information storage unit 124, and the display of the guide frame 300 is changed in accordance with the identified measurement tool. Alternatively, the guide frame 300 may be commonly displayed regardless of the type of measurement tool.

Moreover, in the aforementioned embodiment, the three-dimensional information analysis unit 123 identifies the measurement tool based on the point cloud data. Alternatively, the measurement tool may be identified through a predetermined input operation by a user. With such a configuration, processing for identifying the measurement tool can be omitted. In particular, the configuration above is effective at the time of conducting measurement with only one type of measurement tool. In addition, of pieces of information of the measurement tool stored in the tool information storage unit 124, only pieces of information of the measurement tool, which are selected in advance may be applied to the measurement tool to be identified by the three-dimensional information analysis unit 123. With such a configuration, only a reference about the profile of a limited type of measurement tool may be made; therefore, the speed of a process for identifying the tool can be increased, and the accuracy of identification of the tool can be increased.

Furthermore, in the aforementioned embodiment, the three-dimensional information analysis unit 123 identifies the profile and position of the measurement tool, but in addition thereto, the orientation of the measurement tool may be identified. Then, in accordance with the identified orientation, the guide frame may be displayed tilted in conformity to the orientation of the measurement tool. Alternatively, the navigation information may be generated such that the orientation (inclination) of the measurement tool is guided to align with the orientation of the guide frame.

The embodiments described above or specific examples thereof to which a person skilled in the art has made appropriate component addition, removal, and design change may be included in the scope of the invention as long as the embodiments or examples include the gist of the invention.

REFERENCE SIGNS LIST

100 Measurement data collection device
110 HMD Unit
120 Control unit
111 Frame
112 Display screen
113 Camera
114 3D sensor
123 Three-dimensional information analysis unit
124 Tool information storage unit
126 Support information generation unit
121 Measurement value reading unit
122 Measurement data storage unit
127 Display control unit
200 Measurement tool
210 Measurement value display
300 Guide frame
310 Navigation information
320 Measurement value display area

The invention claimed is:

1. A measurement data collection device comprising:
a head-mounted display unit wearable on the head of a user; and
a control unit configured to control the head-mounted display unit,
the measurement data collection device being configured to collect a measurement value measured by a measurement tool handled by the user,
wherein the head-mounted display unit includes,
a frame wearable on the head of the user,
a display screen of transmissive type supported by the frame at a position to cover a field of view of the user in a state where the head-mounted display unit is worn by the user and configured to display a three-dimensional image by superimposing the three- dimensional image on a real space, and
a camera supported by the frame at a position to image the front of the user in a state where the head-mounted display unit is worn by the user,
the control unit includes,
a support information generation unit configured to generate a guide frame as support information, the guide frame being displayed in a reading position which is a suitable position of the measurement tool to be imaged by the camera,
a display control unit configured to control the support information generated by the support information generation unit to be displayed on the display screen, and
a measurement value reading unit configured to read a measurement value by analyzing an image of the measurement tool captured by the camera,
the head-mounted display unit further includes a 3D sensor supported by the frame to face toward the front of the user in a state where the head-mounted display unit is worn by the user and configured to acquire point cloud data indicating a position of an object body in front of the user,
the control unit further includes a three-dimensional information analysis unit configured to identify, based on the point cloud data acquired by the 3D sensor, a position of the measurement tool handled by the user,
the support information generation unit generates, based on the position of the measurement tool identified by the three-dimensional information analysis unit, navigation information as the support information, the navigation information guiding the user to move the measurement tool close to the reading position, and
the display control unit displays the navigation information on the display screen in accordance with a current position of the measurement tool and the reading position.

2. The measurement data collection device according to claim 1, wherein the support information generation unit generates the guide frame in fixed coordinates on a relative coordinate system based on a point of the head-mounted display unit.

3. The measurement data collection device according to claim 1, wherein when the position of the identified measurement tool coincides with the reading position, the three-dimensional information analysis unit outputs a trigger signal for prompting the camera to capture the image of the measurement tool.

4. The measurement data collection device according to claim 1, wherein the three-dimensional information analysis unit identifies, based on the point cloud data acquired by the 3D sensor, the type of the measurement tool handled by the user and identifies, in accordance with the type of the measurement tool, the size, position, and/or shape of the guide frame generated by the support information generation unit.

5. The measurement data collection device according to claim 1 further comprising a measurement data storage unit configured to store measurement data obtained by associating the measurement value read by the measurement value reading unit with information of the measurement tool used in the measurement.

6. A non-transitory computer-readable storage medium storing a program for causing a computer to function as the control unit of the measurement data collection device described in claim 1.

7. The measurement data collection device according to claim 4, wherein the support information generation unit displays the guide frame having the size, position, and/or shape identified by the three-dimensional information analysis unit on the display screen.

8. A measurement data collection device comprising:
a head-mounted display unit wearable on the head of a user; and
a control unit configured to control the head-mounted display unit,
the measurement data collection device being configured to collect a measurement value measured by a measurement tool handled by the user,
wherein the head-mounted display unit includes,
a frame wearable on the head of the user,
a display screen of transmissive type supported by the frame at a position to cover a field of view of the user in a state where the head-mounted display unit is worn by the user and configured to display a three-dimensional image by superimposing the three- dimensional image on a real space, and
a camera supported by the frame at a position to image the front of the user in a state where the head-mounted display unit is worn by the user,
the control unit includes,
a support information generation unit configured to generate a guide frame as support information, the guide frame being displayed in a reading position which is a suitable position of the measurement tool to be imaged by the camera,
a display control unit configured to control the support information generated by the support information generation unit to be displayed on the display screen, and
a measurement value reading unit configured to read a measurement value by analyzing an image of the measurement tool captured by the camera,
the head-mounted display unit further includes a 3D sensor supported by the frame to face toward the front of the user in a state where the head-mounted display unit is worn by the user and configured to acquire point cloud data indicating a position of an object body in front of the user,
the control unit further includes a three-dimensional information analysis unit configured to identify, based on the point cloud data acquired by the 3D sensor, a position of the measurement tool handled by the user, and
the three-dimensional information analysis unit determines whether a measurement value display of the measurement tool is located in the reading position, and outputs a trigger signal for prompting the camera to capture the image of the measurement tool in response to a determination that the measurement value display is located in the reading position.

9. A measurement data collection device comprising:
a head-mounted display unit wearable on the head of a user; and
a control unit configured to control the head-mounted display unit,
the measurement data collection device being configured to collect a measurement value measured by a measurement tool handled by the user,
wherein the head-mounted display unit includes,
a frame wearable on the head of the user,
a display screen of transmissive type supported by the frame at a position to cover a field of view of the user in a state where the head-mounted display unit is worn by the user and configured to display a three-dimensional image by superimposing the three- dimensional image on a real space, and
a camera supported by the frame at a position to image the front of the user in a state where the head-mounted display unit is worn by the user,
the control unit includes,
a support information generation unit configured to generate a guide frame as support information, the guide frame being displayed in a reading position which is a suitable position of the measurement tool to be imaged by the camera,
a display control unit configured to control the support information generated by the support information generation unit to be displayed on the display screen, and
a measurement value reading unit configured to read a measurement value by analyzing an image of the measurement tool captured by the camera,
the head-mounted display unit further includes a 3D sensor supported by the frame to face toward the front of the user in a state where the head-mounted display unit is worn by the user and configured to acquire point cloud data indicating a position of an object body in front of the user,
the control unit further includes a three-dimensional information analysis unit configured to identify, based on the point cloud data acquired by the 3D sensor, a profile and a position of the measurement tool handled by the user,
the control unit further includes a tool information storage unit storing a type of the measurement tool and a size, position, and/or shape of the guide frame associated with the type of the measurement tool,
the three-dimensional information analysis unit refers to the tool information storage unit with the profile identified by the three-dimensional information analysis unit to identify the type of the measurement tool handled by the user and identify, in accordance with the type of the measurement tool, the size, position, and/or shape of the guide frame generated by the support information generation unit, and
the support information generation unit displays the guide frame having the size, position, and/or shape identified by the three-dimensional information analysis unit on the display screen.

* * * * *